United States Patent [19]

Duncan

[11] Patent Number: 5,003,932
[45] Date of Patent: Apr. 2, 1991

[54] INTAKE MANIFOLD

[75] Inventor: Harold D. Duncan, Dearborn, Mich.

[73] Assignee: Ford Motor Company, Dearborn, Mich.

[21] Appl. No.: 558,280

[22] Filed: Jul. 26, 1990

[51] Int. Cl.[5] ............................................. F02M 35/10
[52] U.S. Cl. ......................... 123/52 MB; 123/52 MC
[58] Field of Search ......... 123/52 M, 52 MB, 52 MC, 123/52 MV

[56] References Cited

U.S. PATENT DOCUMENTS

| 2,730,339 | 1/1956 | Presnell | 123/55 VE |
| 4,803,961 | 2/1989 | Hiraoka et al. | 123/52 MV |
| 4,889,083 | 12/1989 | Honma et al. | 123/52 MV |

FOREIGN PATENT DOCUMENTS 0143318  6/1988  Japan ........................... 123/52 MV Primary Examiner—David A. Okonsky
Attorney, Agent, or Firm—John E. Nemazi; Jerome R. Drouillard; Keith L. Zerschling

[57] ABSTRACT

A low profile ram-tube intake manifold is disclosed for use on an internal combustion engine having a plurality of intake ports. The manifold includes an elongated plenum having an inlet and a series of outlets spaced along the length thereof. A plurality of substantially symmetrical tubular spiral runners are connected at one end to the plenum outlet and have the other end adapted to be attached to one of the intake ports. The spiral runners are substantially symmetrical and have a uniform flow resistance length and cross-sectional area to achieve optimum engine performance while utilizing a very compact intake manifold.

15 Claims, 3 Drawing Sheets

INTAKE MANIFOLD

TECHNICAL FIELD

This invention relates to intake manifolds for multi-cylinder internal combustion engines and more particularly to intake manifolds used in conjunction with V-type engines.

BACKGROUND ART

Intake manifold technology has evolved constantly throughout the history of the automobile industry. Even though the intake phenomenon, which is a rather complex and dynamic event, is relatively well understood as a result of computer modeling efforts of the last twenty-five years, designing an intake manifold for a specific engine and vehicle application remains an exceedingly difficult task. It is simple to design a manifold for a engine which runs at one speed where there is no engine compartment space limitations. However, in the real world where engines must fit within relatively small engine compartments and the engine needs to operate throughout a wide speed range, manifold design becomes a series of difficult compromises.

The concept of manifold tuning is well known. It is possible to select plenum volume, an intake manifold runner length, and a cross-sectional area so that the frequency of the pressure wave within the runner optimizes the pressure at the intake port when the intake valve is open. Tuned manifolds are designed to optimize performance within a selected engine speed band. Frequently, tuned intake manifolds will actually hinder engine performance when operated substantially outside of the selected band such as in extremely low engine speeds or very high engine speeds. As a result of efforts to improve fuel economy, smaller and smaller engines are being utilized today and there is a renewed interest in improving engine wide-open throttle performance.

The interest in ram-tube manifolds appeared to peak in the 1960's when they were used extensively on high performance race cars. Examples of early ram-tube induction systems are illustrated in U.S. Pat. Nos. 2,845,911; 2,927,564; and 3,303,832. As illustrated in the Platner U.S. Pat. No. 3,303,832, a ridiculously large manifold by modern standards was used in order to achieve sufficient runner length and to maintain uniform runner-to-runner flow characteristics to optimize performance at a selected engine operating speed range.

The problem facing designers today is to optimize engine performance within the confines of a very small engine compartment. It is also necessary to design a manifold which is as simple as possible so that it can be manufactured cost effectively while maintaining manifold weight to a minimum.

Examples of more recent ram-tube intake manifolds are illustrated in U.S. Pat. Nos. 4,440,120 to Butler; 4,643,138 to Ruf et al; 4,643,137 to Choushi et al; and 4,669,428 to Ichida et al. In order to achieve a long runner length and a compact manifold, the Butler and Ruf et al patents disclose a manifold which utilized runners which extend generally helically about a longitudinal axis above and parallel to the crankshaft axis in a V-type engine. The Ichida patent utilizes a variable length intake runner manifold design in which the intake manifold extends a very significant distance in front of the engine to obtain suitable runner length without becoming excessively high.

The Choushi et al patent utilizes a central plenum between and raised above the engine in which a plurality of generally J-shaped runners extend out each side of the elongated plenum and cross over to connect to the intake port on the opposite side of the engine in a crisscross manner.

It is an object of the present invention to provide a ram-tube intake manifold which has a minimal height and length in order to compactly fit on top of the engine so as to fit within small engine compartments.

Another feature of the present invention to provide equal length and cross-sectional area runners having the minimal uniform flow resistance which achieves the optimal tuning effect in the selected engine operating speed range.

These and other advantages and features of the present invention are described in the accompanying specification and drawings.

DISCLOSURE OF THE INVENTION

A low profile ram-tube intake manifold is provided for use on an internal combustion multi-cylinder engine having a series of intake ports. The manifold is provided with an elongated plenum having an inlet and a plurality of outlets spaced along the length thereof. A plurality of substantially symmetrical tubular spirals are provided, each having one end communicating to a plenum outlet and the other end adapted to be attached to an intake port. Each of the spiral runners is oriented about a generally vertical axis to achieve the desired runner length while maintaining a low manifold profile.

In one embodiment of the invention for use with an A-type engine, two non-symmetrical tubular runners are provided for attachment to the end intake ports of opposite cylinder heads to enable the elongated plenum length to be minimized.

BEST MODE FOR CARRYING OUT THE INVENTION

With reference to FIGS. 1-5, the preferred embodiment of the invention will be described.

Figure 1:
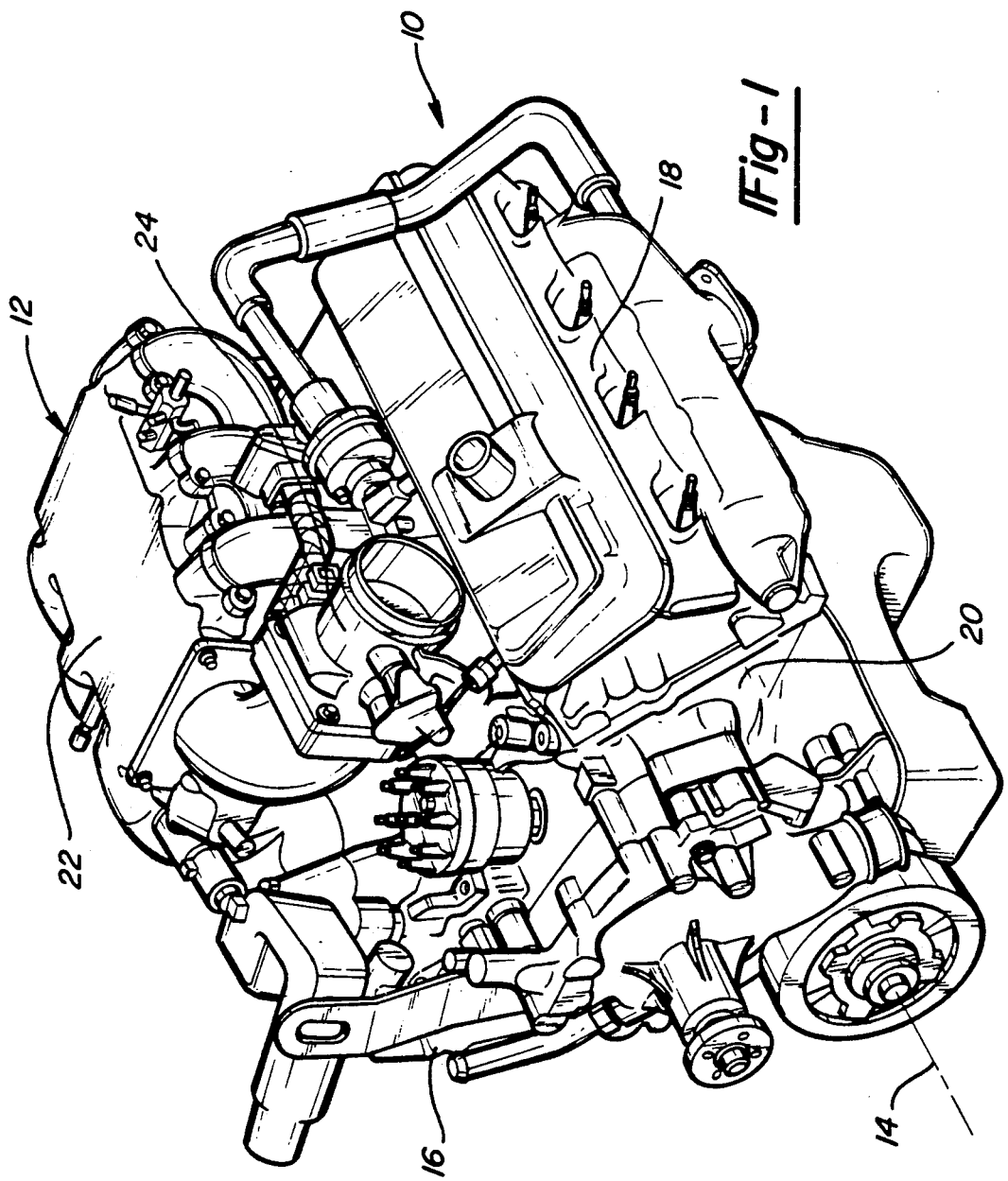
FIG. 1 is a perspective view of a V-8 engine having a ram-tube intake manifold of the present invention installed thereon.
Figure 2:
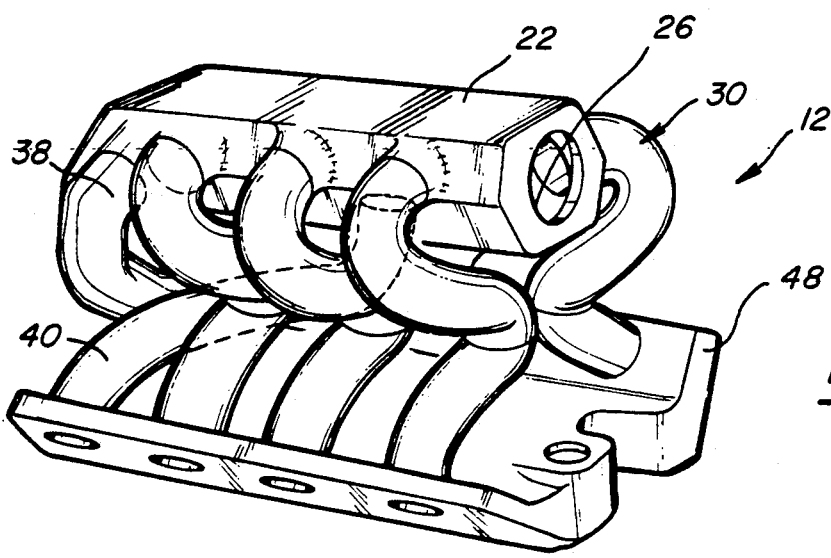
FIG. 2 is a perspective view of a ram-tube intake manifold of the present invention.

FIG. 1 depicts a modern V-8 engine 10 having a ram-tube intake manifold 12 of the present invention installed thereon. Engine 10 is of V-8 configuration having two banks of four cylinders oriented 90° to one another. The engine has a longitudinal crank shaft axis 14 and a pair of cylinder heads 16 and 18.

Intake manifold 12 is connected to the engine block 20 as well as the left and right cylinder heads 16 and 18. The intake manifold 12 is provided with a generally elongated plenum 22 which is parallel to crank shaft axis 14 between the two cylinder heads 16 and 18, and spaced above the engine block 20. The elongated plenum is provided with an inlet which is obstructed from view in FIG. 1 by throttle body 24 which is coupled thereto. Throttle body 24 has a typical butterfly valve contained therein for regulating the flow of air into the intake manifold plenum.

Figure 3:
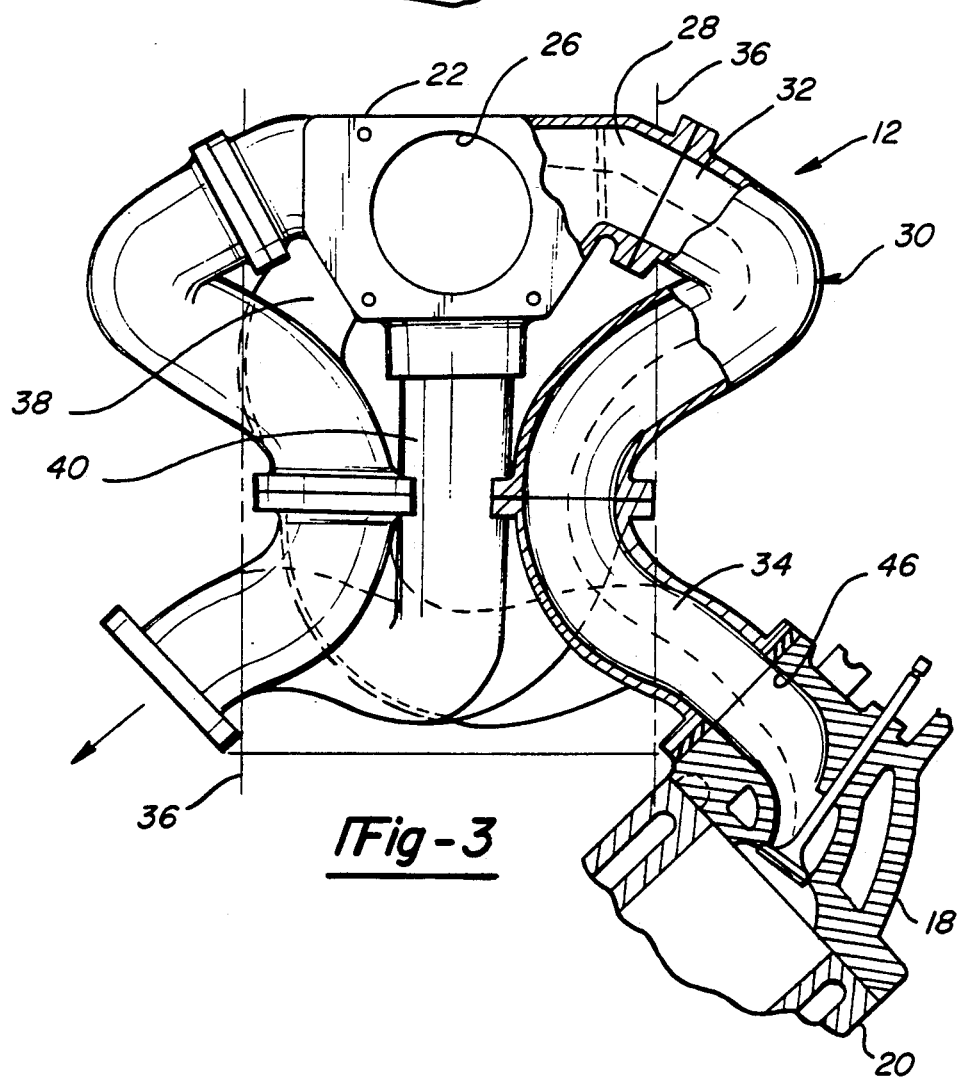
FIG. 3 is a front side elevation of the intake manifold of FIG. 2 with a portion of a cylinder head and engine block shown in cross-section.

In FIGS. 2-5, intake manifold 12 is shown in greater detail. Intake manifold 12 includes an elongated plenum 22 having an inlet 26 and a plurality of outlets spaced along the length thereof. In FIG. 3, a portion of the plenum is broken away to illustrate a typical outlet 28. Manifold 12 is designed for a 90° V-8 engine, however, it should be appreciated that the invention is also ideally suited for V-6 engines of either of 60° or 90° configuration.

The plenum outlets 28 are oriented in pairs extending along the opposite sides of the plenum. As illustrated in FIGS. 2-5, the plenum outlets are aligned substantially transverse to the plenum. Extending between the plenum outlets and each of the engine intake ports are a plurality of intake manifold runners. In the preferred embodiment illustrated, six of the runners are substantially symmetrical tubular spiral runners 30. Each of the spiral runners is provided with a first end 32 in communication with the plenum outlet 28, and a second end 34 adapted to attach to an intake port. Each of the spiral runners 30, spiral about a generally vertical axis 36 in a substantially uniform radius and advancing therealong in a substantially uniform pitch. The spiral runner design enables the intake manifold to maintain a low overall profile for a given runner length and crosssectional area to the symmetry between the various runners excellent flow uniformity may be achieved.

Figure 4:
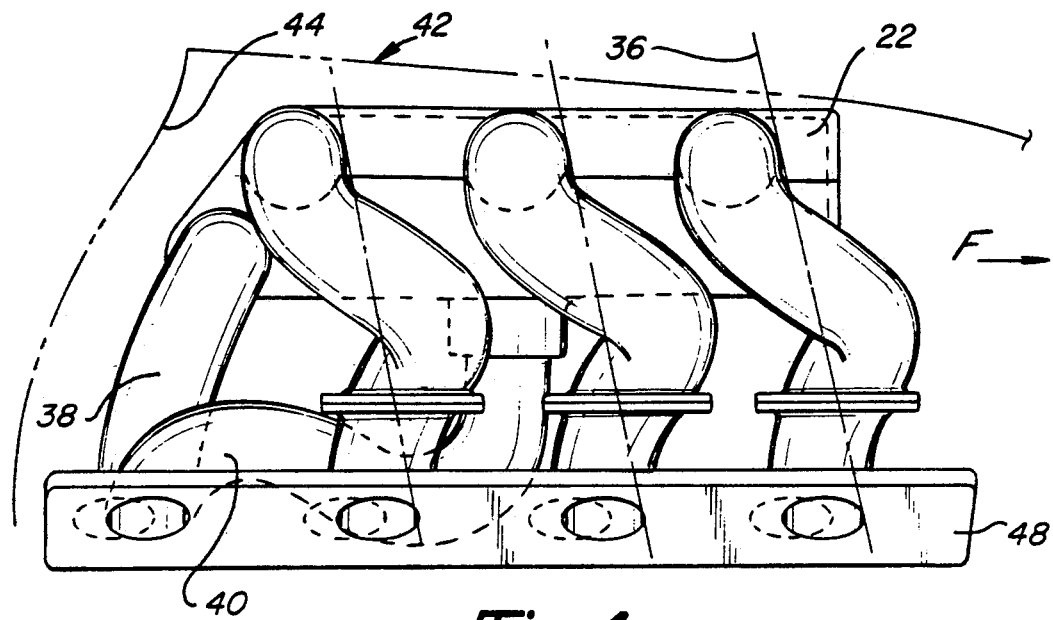
FIG. 4 is a left side elevational view of the intake manifold with the hood line and cowl shown in phantom outline.
Figure 5:
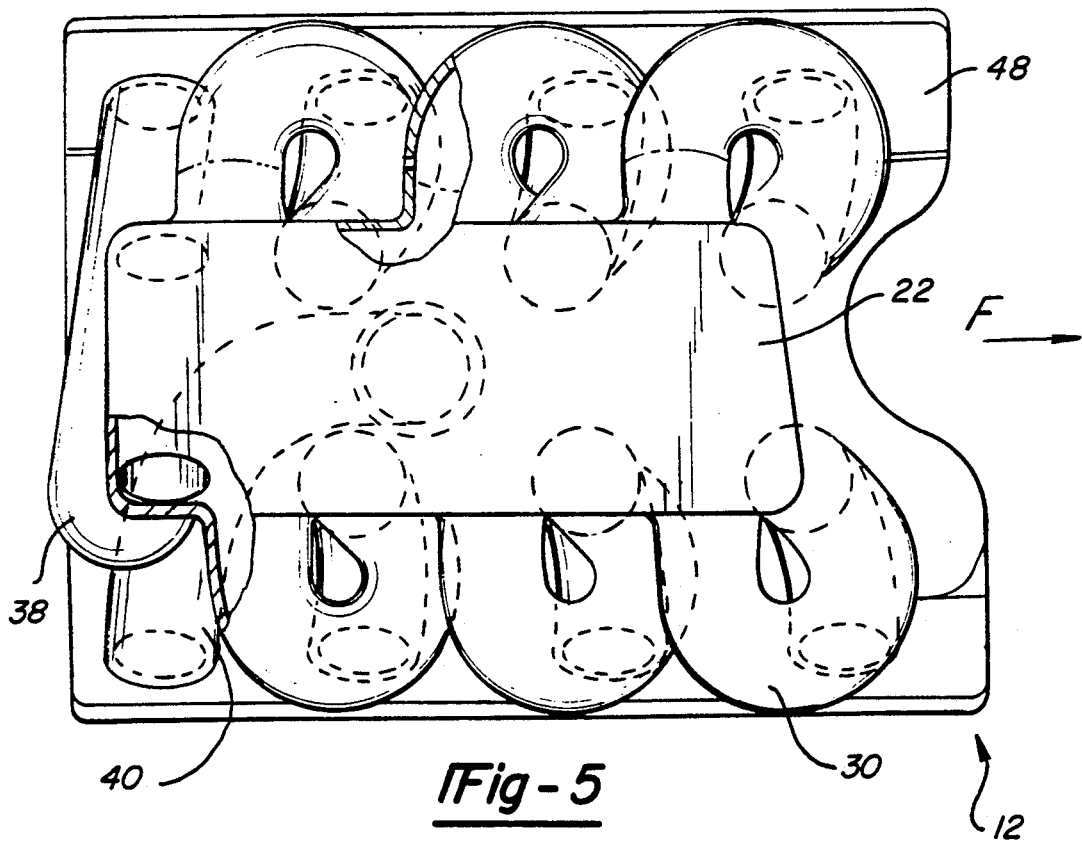
FIG. 5 is a top plan view of the intake manifold.

In the preferred embodiment of the invention illustrated, the intake manifold is provided with two non-symmetrical tubular runners 38 and 40 by forming two of the end runners in a non-spiral design. The overall length and size of the plenum can be substantially reduced by using two non-spiral runners. In the side elevational of the manifold as shown in FIG. 4, the proximity of the manifold hood 42 and cowl 44 is shown. In this, a rear wheel drive vehicle application with a front vehicle longitudinally aligned engine cowl, clearance was a serious problem which was solved using the two non-spiral runner design.

It should be appreciated that an intake manifold of the present invention can be manufactured using only symmetrical tubular spiral runners. In situations such as the rear wheel drive vehicle application illustrated in FIG. 4, where engine-to-cowl clearance is a problem, two non-symmetrical runners can be used in the plenum. This design allows the overall manifold size reduced substantially without adversely affecting manifold performance. The two non-symmetrical runners 38 and 40 are the same length and have the same cross-sectional area as the spiral runners 30. The spiral runner design provides sufficient space beneath the plenum to accommodate the placement of an outlet port extending downwardly along a vertical axis. It should be noted that the placement of non-symmetrical runners illustrated could not be achieved in intake manifolds with J-shaped runners which cross over beneath the plenum as in U.S. Pat. Nos. 4,643,167 and 4,649,871. As shown in FIGS. 2-5 and particularly in FIG. 3, it can be seen that each intake runner is coaxially aligned with the corresponding intake port 46 in the engine cylinder head. In order to minimize flow resistance, the bends in the intake runners are maintained as gradual as possible.

As shown in FIG. 4, axis 36 about which the spiral runners are oriented is rearwardly inclined slightly but remains generally vertical. The spiral runners spiral about their respective axes approximately one full turn extending between the plenum outlet and connecting to the intake port in substantially coaxial alignment.

Preferably, the intake manifold of the present invention are formed of several separate aluminum castings which are fastened together. In the embodiment illustrated, the manifold is made up of a base portion 48, a plenum 22 and a series of tubular runner portions 30 extending therebetween. It should also be appreciated that an intake manifold of the present design can be fabricated by using tubular material to form the runners as opposed to an aluminum casting process.

EXAMPLE

An intake manifold using the present invention having a configuration substantially similar to the drawings was designed for use on a 90 degree V-8, four-cycle, naturally aspirated gasoline engine. The engine had a displacement of 7.5 liters. The manifold was designed to optimize performance in a typical light truck application. The plenum had a volume of 4.1 liters, slightly greater than half the engine displacement. For best overall performance, a runner length of 41 centimeters measured along the runner centerline was utilized. The runners had a substantially circular cross-sectional area with an inside diameter of 4.8 centimeters. All of the runners were of equal length and inside diameter and were designed to coaxially align with each of the respective intake ports to which they were coupled.

The manifold described in the example, provided excellent engine performance in the 3000-4000 rpm range. One should note, however, that in a different vehicle having a different size engine, weight, or transmission shift pattern, the actual runner length, runner diameter and plenum size could vary significantly. One of the advantages of the present invention is that ram tube manifolds can be designed to fit within a relatively small engine compartment without sacrificing runner length or uniformity.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

I claim:

1. A low profile ram-tube intake manifold for an internal combustion engine having a plurality of intake ports, said intake manifold comprising:
    an elongated plenum having an inlet and a plurality of outlets spaced along the length thereof; and
    a plurality of substantially symmetrical tubular spiral runners, each having one end communicating with a plenum outlet, and the other end adapted to be attached to an intake port, each of said spiral runners spiraling about an axis at a substantially uniform radius and advancing therealong at a substantially uniform pitch to provide a low manifold profile having a minimal uniform flow resistance for a given runner length, cross-sectional area, and available space.

2. The manifold of claim 1, wherein each of the spiral runners extends about its respected axis approximately one full turn.

3. The manifold of claim 1, wherein each of the axes of the spiral runners are generally vertical.

4. The manifold of claim 1 wherein each of the axes of the spiral runners are spaced apart and parallel to one another.

5. The manifold of claim 1 for installation on a V-type internal combustion engine having a pair of cylinder heads each provided with a plurality of intake ports, wherein said plenum is located above said cylinder heads, generally between and parallel thereto.

6. The manifold of claim 1, wherein each of said spiral runners spirals about its respective axis approximately one full turn, and is adapted for attachment to an intake port in substantially coaxial alignment.

7. A low profile ram-tube intake manifold for a V-type internal combustion engine having a pair of spaced apart parallel cylinder heads each provided with a plurality of intake ports, said intake manifold comprising:
an elongated plenum having an inlet and a plurality of outlets spaced along the length thereof; and
a plurality of tubular spiral runners each having one end communicating with a plenum outlet and the other end adapted to be attached to an intake port, wherein each of said spiral runners is generally aligned with one of a plurality of generally vertical axes to establish a low compact manifold configuration having runners of uniform length, cross-sectional area and flow resistance.

8. The manifold of claim 7, wherein said elongated plenum is provided with at least three pairs of outlets wherein all but two of said outlets are connected to said tubular spiral runners, said manifold further comprising two non-spiral tubular runners each having one end communicating with a plenum outlet and the other end adapted to be attached to an intake port, each of said non-spiral tubular runners have a length flow resistance and crosssectional area substantially equal to that of said spiral runners thereby enabling a shorter length elongated plenum without sacrificing manifold performance.

9. The manifold of claim 8, wherein said non-spiral tubular runners are adapted to be coupled to an end intake port on different cylinder heads.

10. The manifold of claim 9, wherein at least one of said non-symmetrical tubular runners is generally vertical in the region of attachment to the elongated plenum and extending downwardly therefrom and between the plurality of spiral runners.

11. The manifold of claim 8, wherein each of the spiral runners extends about its respected axis approximately one full turn.

12. The manifold of claim 8, wherein each of the axes of the spiral runners are generally vertical.

13. The manifold of claim 8, wherein the plenum inlet is formed in the end of the plenum opposite that to which the non-symmetrical runners communicate.

14. The manifold of claim 13 wherein the plenum and plenum inlet are generally coaxially aligned along an axis parallel to that of the engine.

15. The manifold of claim 7, wherein the internal diameter of each of the runners is generally uniform and substantially circular.

* * * * *

UNITED STATES PATENT AND TRADEMARK OFFICE
CERTIFICATE OF CORRECTION

PATENT NO. : 5,003,932

DATED : April 2, 1991

INVENTOR(S) : Harold D. Duncan

It is certified that error appears in the above-identified patent and that said Letters Patent is hereby corrected as shown below:

Column 5, line 2 (Claim 2), "respected" should be
--respective--.

Column 6, line 20 (Claim 11), "respected" should be
--respective--.

Signed and Sealed this

Eighth Day of September, 1992

*Attest:*

DOUGLAS B. COMER

*Attesting Officer*     *Acting Commissioner of Patents and Trademarks*